United States Patent
Benkert et al.

(10) Patent No.: US 12,479,278 B2
(45) Date of Patent: Nov. 25, 2025

(54) ENCLOSURE SEAL WITH EXTENDED/FOLDABLE LEG

(71) Applicant: Super ATV, LLC, Madison, IN (US)

(72) Inventors: Russell Benkert, Madison, IN (US); Colton Pifer, North Vernon, IN (US)

(73) Assignee: Super ATV, LLC, Madison, IN (US)

( * ) Notice: Subject to any disclaimer, the term of this patent is extended or adjusted under 35 U.S.C. 154(b) by 75 days.

(21) Appl. No.: 18/634,005

(22) Filed: Apr. 12, 2024

(65) Prior Publication Data

US 2025/0319754 A1    Oct. 16, 2025

(51) Int. Cl.
  *B60J 10/24* (2016.01)
  *B60J 10/30* (2016.01)
  *B60J 10/90* (2016.01)
  *F16J 15/02* (2006.01)

(52) U.S. Cl.
  CPC ............... *B60J 10/24* (2016.02); *B60J 10/30* (2016.02); *B60J 10/90* (2016.02); *F16J 15/025* (2013.01); *F16J 15/027* (2013.01)

(58) Field of Classification Search
  CPC . B60J 10/24; B60J 10/277; B60J 10/30; B60J 10/90; F16J 15/025; F16J 15/027
  See application file for complete search history.

(56) References Cited

U.S. PATENT DOCUMENTS

| | | | |
|---|---|---|---|
| 2,591,833 A | 4/1952 | Kreimendahl | |
| 2,620,224 A | 12/1952 | Hedley | |
| 2,988,788 A * | 6/1961 | Saponara | F25D 23/087 49/492.1 |
| 4,930,835 A | 6/1990 | Bruce | |
| 5,950,366 A * | 9/1999 | Uhlmeyer | B60J 10/70 296/213 |
| 7,380,862 B2 * | 6/2008 | Olney | B60J 10/90 49/495.1 |
| 7,806,455 B2 * | 10/2010 | Polke | B60J 10/30 296/93 |
| 9,073,421 B2 * | 7/2015 | Deussen | B60J 10/30 |
| 10,005,418 B2 | 6/2018 | Ito | |
| 2006/0097541 A1 * | 5/2006 | Olney | B60J 10/90 296/107.04 |
| 2014/0327267 A1 * | 11/2014 | Deussen | B60J 10/70 296/93 |
| 2015/0251528 A1 * | 9/2015 | Deussen | B60J 10/70 296/93 |

* cited by examiner

*Primary Examiner* — Nicholas L Foster
(74) *Attorney, Agent, or Firm* — Woodard, Emhardt, Henry, Reeves & Wagner, LLP (57) ABSTRACT

Disclosed is a seal configured to be coupled to a flexible enclosure. The seal comprises a bulb with a first end and a second end and includes at least a first and second sidewall. A first leg extends in a first direction from the first sidewall of the bulb along the length of the bulb. The first leg is hingeably attached to the bulb of the seal. A second leg extending in a second direction from the first sidewall of the bulb along the length of the bulb. The second direction is at least 45 degrees offset from the first direction of the first leg. The first leg is configured to be hinged relative to the bulb until the first and second directions of the first and second legs are colinear. The first and second legs are configured to be attached to the flexible enclosure.

21 Claims, 7 Drawing Sheets

ENCLOSURE SEAL WITH EXTENDED/FOLDABLE LEG

FIELD OF THE INVENTION

This invention generally relates to seals for soft-fabric enclosures and, more specifically, relates to an enclosure seal with a foldable leg.

BACKGROUND OF THE INVENTION

The present disclosure relates to a seal for a flexible enclosure, such as soft cab enclosures made for some vehicles. Some vehicles are manufactured and marketed as having a removable soft cab enclosure so a user can selectively attach the enclosure, as needed. For example, an owner of an open-top vehicle may choose to leave the enclosure off if the weather is sunny and temperate. Alternatively, the owner may attach the enclosure if the weather is rainy or if the occupants of the vehicle would otherwise need protection from the elements.

Flexible enclosures may also be added as a retrofit item for various types of vehicles. For example, a flexible enclosure can be secured to an off-road/work vehicle such as a UTV. In this way, users can selectively attach the flexible enclosure in the event of bad weather or harsh environmental conditions. These after-market enclosures sometimes require water-proof seals to ensure the cab of the vehicle is protected from the elements.

Flexible enclosures of this kind generally include a seal where the enclosure and the vehicle meet. The seal ensures that the enclosure is an air and/or liquid tight cover, depending on the seal and the cover being utilized. However, securely attaching the seal to the periphery of the enclosure during manufacturing can be tedious, time-consuming, and requires experienced hands. Thus, there is a need for improvement in the field.

SUMMARY

Certain enclosed embodiments include an enclosure seal for a flexible enclosure, such as a soft cab enclosure for a vehicle. In one exemplar embodiment, the seal includes a bulb comprising a first, second, and third sidewall. The seal also includes a first leg and a second leg extending from the first sidewall of the bulb. The seal is configurable in a neutral state and a bent state. In the neutral state, the first leg is colinear with the second sidewall of the bulb and extends from the first sidewall in a first direction. The second leg also extends from the first sidewall, but in a second direction. The second direction is at least 45 degrees offset from the direction of the first leg. In an exemplar embodiment, the second leg is 90 degrees offset from the first leg.

The first leg is hingeably attached to the first sidewall of the bulb. Rotating the bulb about the hinge places the first leg in a colinear position with the second leg, defining the bent state. In the bent state, the first leg is approximately perpendicular with the second sidewall.

Certain enclosed embodiments also include a method of attaching the seal to a flexible enclosure. In the neutral state, the first leg of the seal is placed abutting the flexible enclosure and securely attached thereto. The bulb is rotated so the seal is in the bent state. Again, in the bent state, the second leg is colinear with the first leg so the second leg abuts a different portion of the flexible enclosure adjacent to the first leg. The second leg is securely attached to the flexible cover.

DETAILED DESCRIPTION OF THE DRAWINGS

For the purposes of promoting an understanding of the principles of the invention, reference will now be made to certain embodiments and specific language will be used to describe the same. It will nevertheless be understood that no limitation of the scope of the invention is thereby intended, such alterations and further modifications, and such further applications of the principles of the invention as described herein being contemplated as would normally occur to one skilled in the art to which the invention relates. Additionally, in the detailed description below, numerous alternatives are given for various features. It will be understood that each such disclosed alternative, or combinations of such alternatives, can be combined with the more generalized features discussed in the Summary above, or set forth in the embodiments described below to provide additional disclosed embodiments herein.

The uses of the terms "a" and "an" and "the" and similar references in the context of the disclosure (especially in the context of the following claims) are to be construed to cover both the singular and the plural unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element. As used herein, "neutral state" refers to the state and shape the claimed seal takes when the claimed seal is not subject to an external load or force. "Bent state" refers to the state and shape of the claimed seal when the claimed seal is subjected to an external load that changes the shape of the claimed seal.

Certain enclosed embodiments include an enclosure seal for a flexible enclosure, such as a soft cab enclosure for a vehicle. In one exemplar embodiment, the seal includes a bulb comprising a first, second, and third sidewall. The seal also includes a first leg and a second leg extending from the first sidewall of the bulb. The seal is configurable in a neutral state and a bent state. In the neutral state, the first leg is colinear with the second sidewall of the bulb and extends from the first sidewall in a first direction. The second leg also extends from the first sidewall, but in a second direction. The second direction is at least 45 degrees offset from the direction of the first leg. In an exemplar embodiment, the second leg is 90 degrees offset from the first leg.

The first leg is hingeably attached to the first sidewall of the bulb. Rotating the bulb about the hinge places the first leg in a colinear position with the second leg, defining the bent state. In the bent state, the first leg is approximately perpendicular with the second sidewall.

Certain enclosed embodiments also include a method of attaching the seal to a flexible enclosure. In the neutral state, the first leg of the seal is placed abutting the flexible enclosure and securely attached thereto. The bulb is rotated so the seal is in the bent state. Again, in the bent state, the second leg is colinear with the first leg so the second leg abuts a different portion of the flexible enclosure adjacent to the first leg. The second leg is securely attached to the flexible cover.

Figure 1:
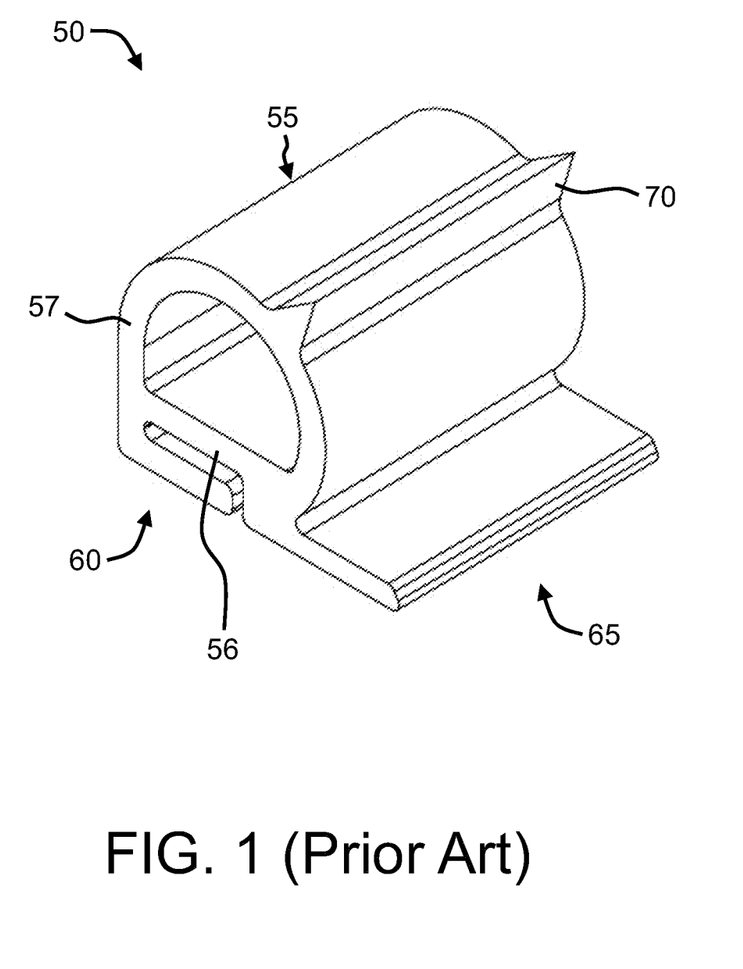
FIG. 1 is a perspective view of a prior art seal for cab enclosures.
Figure 2:
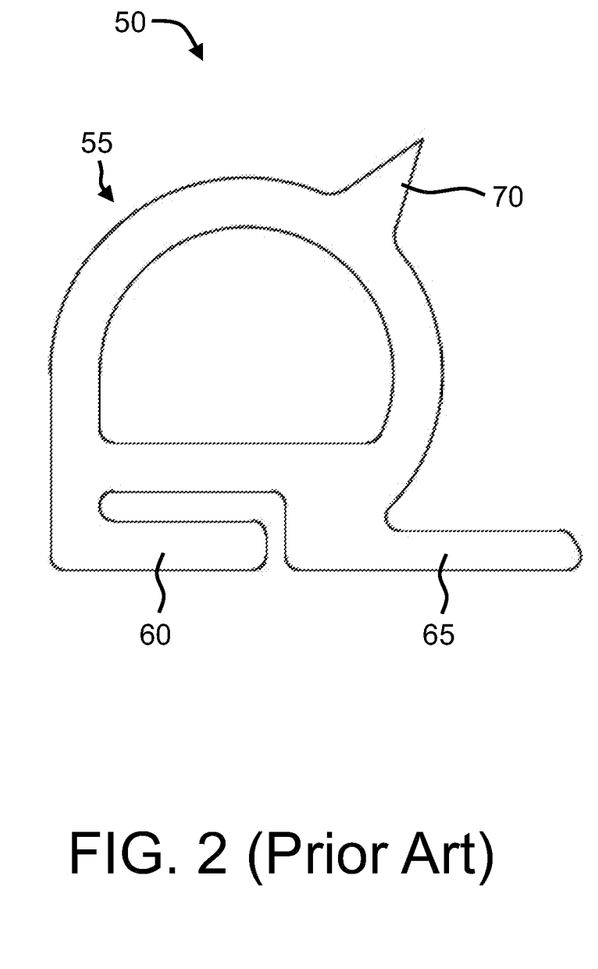
FIG. 2 is a side view of the prior art seal of FIG. 1.

FIG. 1 is a perspective view of a prior art seal 50. FIG. 2 is a side view of the prior art seal 50 of FIG. 1. The seal 50 comprises a bulb 55. In this embodiment, the bulb 55 includes a first sidewall 56 and a second sidewall 57. The bulb includes a leg 60 and a leg 65. The bulb 55 also includes a protrusion 70 that extends from the second sidewall 57 along the length of bulb 55.

The first sidewall 56 and the second sidewall 55 define the body of bulb 55. As shown, this embodiment of a seal 50 has a "D" shaped cross-section. Further, the sidewalls 56, 57 define an internal void and the bulb 55 comprises a hollow tube.

Leg 60 and leg 65 initially extend from the first sidewall 56 of the bulb 55 in a first direction then extends in a second direction such that the leg 60 and the leg 65 each define an "L" shape. Leg 60 and leg 65 are configured to be secured to a flexible enclosure, such as a soft cab enclosure for a vehicle.

The protrusion 70 generally has a triangular shape and extends from the second sidewall 57 of bulb 55. The protrusion 70 is configured to engage a portion of the vehicle that the flexible enclosure is attached to.

To secure the leg 60 to the flexible enclosure, the leg 60 must be rotated away from bulb 55 while physically holding the leg 60 in the rotated position to ensure the leg 60 abuts the flexible enclosure while securing leg 60 to the flexible enclosure. Said differently, the seal 50 must be manually held in an "open" configuration to allow the seal 50 to be attached to the flexible enclosure. The leg 60 is then attached to the flexible enclosure. When the bulb 55 is released, it resumes its configuration depicted in FIG. 2 such that the leg 65 abuts the flexible enclosure. The leg 65 can then be secured to the flexible enclosure. As the prior art seal 50 requires the leg 60 to be held in position during attachment to the flexible enclosure, the attachment process of securing the seal 50 to the flexible enclosure can be difficult.

For example, while holding the leg 60 in the rotated position (i.e., away from bulb 55), an assembler must simultaneously attach the leg 60 to the portion of the flexible cover that leg 60 abuts. In many instances, seals depicted in FIG. 1 and FIG. 2 are attached to flexible enclosure by sewing. This requires an assembler to keep leg 60 in place, keep bulb 55 out of the way, all while sewing leg 60 to the enclosure. Accordingly, there exists a need for a more efficient and less difficult means of securing the seal 50 to the flexible enclosure.

Figure 3:
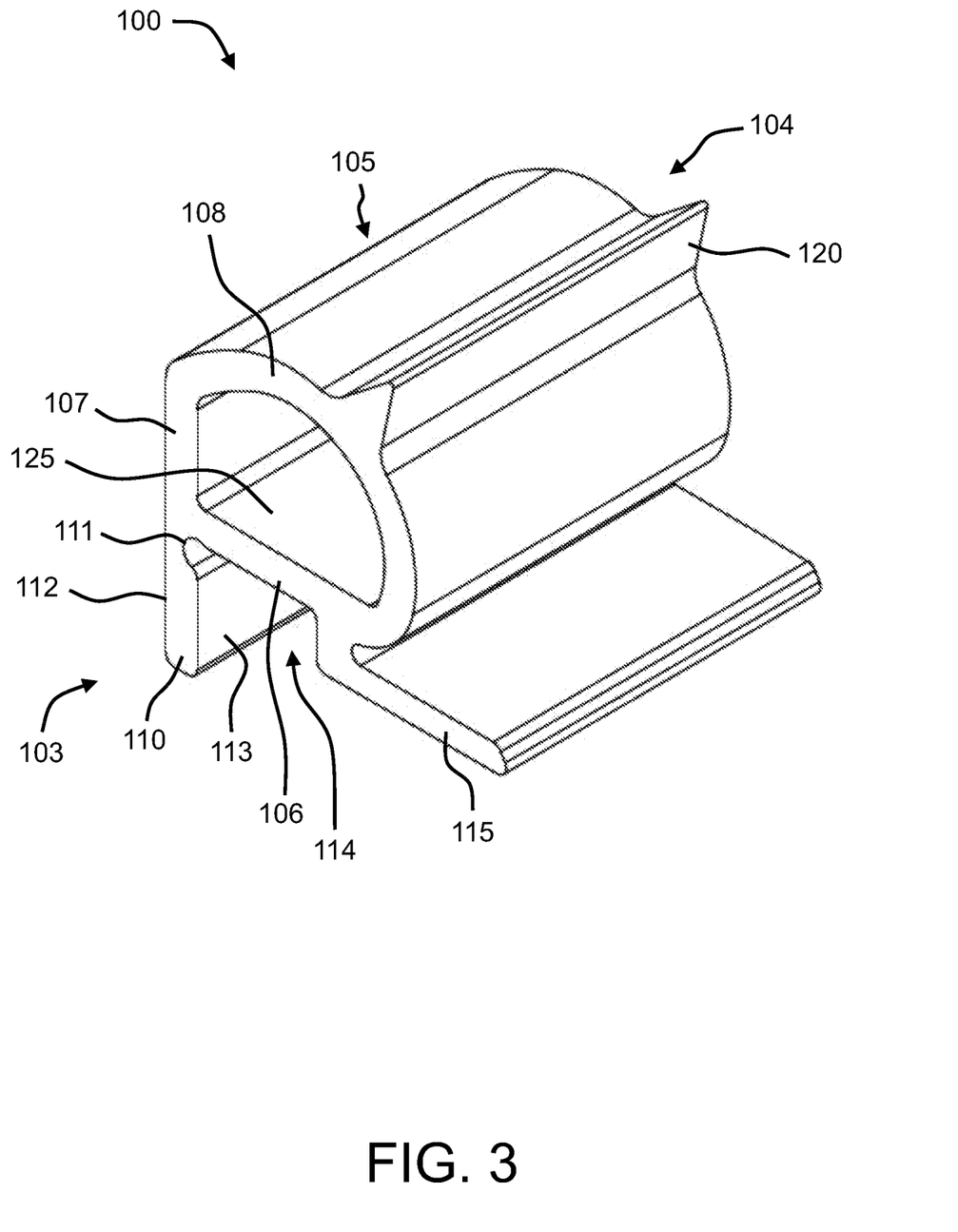
FIG. 3 is a perspective view of an embodiment of a seal for cab enclosures according to one embodiment of the present disclosure.

FIG. 3 is a perspective view of an embodiment of a seal 100 in a neutral state according to the present disclosure. The seal 100 comprises a bulb 105. The bulb 105 includes a first end 103 and a second end 104 defining a length of bulb 105 therebetween.

In this embodiment, the bulb 105 includes a first sidewall 106, a second sidewall 107, and a third sidewall 108. However, in other embodiments of seals, a different number of sidewalls may be used (e.g., one, three, four, or more). As such, the bulb 105 of seal 100 may be any suitable shape. The bulb 105 also includes a leg 110, a leg 115, and a protrusion 120. The protrusion 120 extends form the third sidewall 108 along the length of the bulb 105. In some embodiments, the seal 100 is a unitary molded, monolithic piece of material. The seal 100 is made of rubber and/or polyurethane or any other suitable, semi-flexible material. In some embodiments, the seal is formed by extrusion. In other embodiments, 3D printing may be used to create seal 100. In some embodiments, the seal 100 is sufficiently elastic to move between the illustrated neutral and bent states without permanently deforming.

The first sidewall 106, the second sidewall 107, and the third sidewall 108 define the body of bulb 105. As shown, this embodiment of a seal 100 has a "D" shaped cross-section. Further, the sidewalls 106, 107, and 108 define cavity 125 such that the bulb 105 comprises a hollow tube. In other embodiments, the bulb 105 may not be hollow but rather a solid piece of material. In the embodiment depicted, the first sidewall 106, second sidewall 107, third sidewall 108, leg 110, and leg 115 are approximately the same thickness. In other embodiments, different thicknesses for each respective component may be used.

The leg 110 includes a first side 112 and a second side 113. The leg 110 extends in a first direction f from the first sidewall 106 of bulb 105. As shown, the leg 110 extends from the bulb 105 along the entire length of bulb 105. The leg 110 is also hingeably attached to the bulb 105 and first sidewall 106 at hinge point 111. In the embodiment shown, hinge point 111 defines a hinge made of a thin portion of material X, such that the material at hinge point 111 is thinner than the thickness W of leg 110. In other embodiments, a flexure bearing or living hinge may be used to couple the leg 110 to the first sidewall 106 of bulb 105. Any suitable hinge may be used to couple the leg 110 to the bulb 105, as will be appreciated by those of skill in the art. The seal 100 of FIG. 3 depicts the seal in a neutral state. In this state, the first side 112 of the leg 110 and the second sidewall 107 are colinear.

The second side 113 of leg 110 defines recess 114 between leg 110 and the first sidewall 106 of bulb 105. Further, the second side 113 of leg 110 faces leg 115. The leg 115 extends along the length of bulb 105 in a second direction S from the first sidewall 106. The second direction is at least 45 degrees offset angle A from the first direction of the leg 110. In some embodiments, the leg 115 initially extends from the first sidewall 106 of the bulb 105 in the first direction F, then extends in the second direction S such that the leg 115 defines an "L" shape. In the embodiment shown in FIG. 3, the leg 115 extends initially from the first sidewall 106 in the first direction F, then extends in the second direction S at approximate 90 degrees offset from the first direction F.

Leg 110 and leg 115 are configured to be secured to a flexible enclosure, such as a soft cab enclosure for a vehicle (discussed in more detail with reference to FIGS. 5 and 6).

Figure 4:
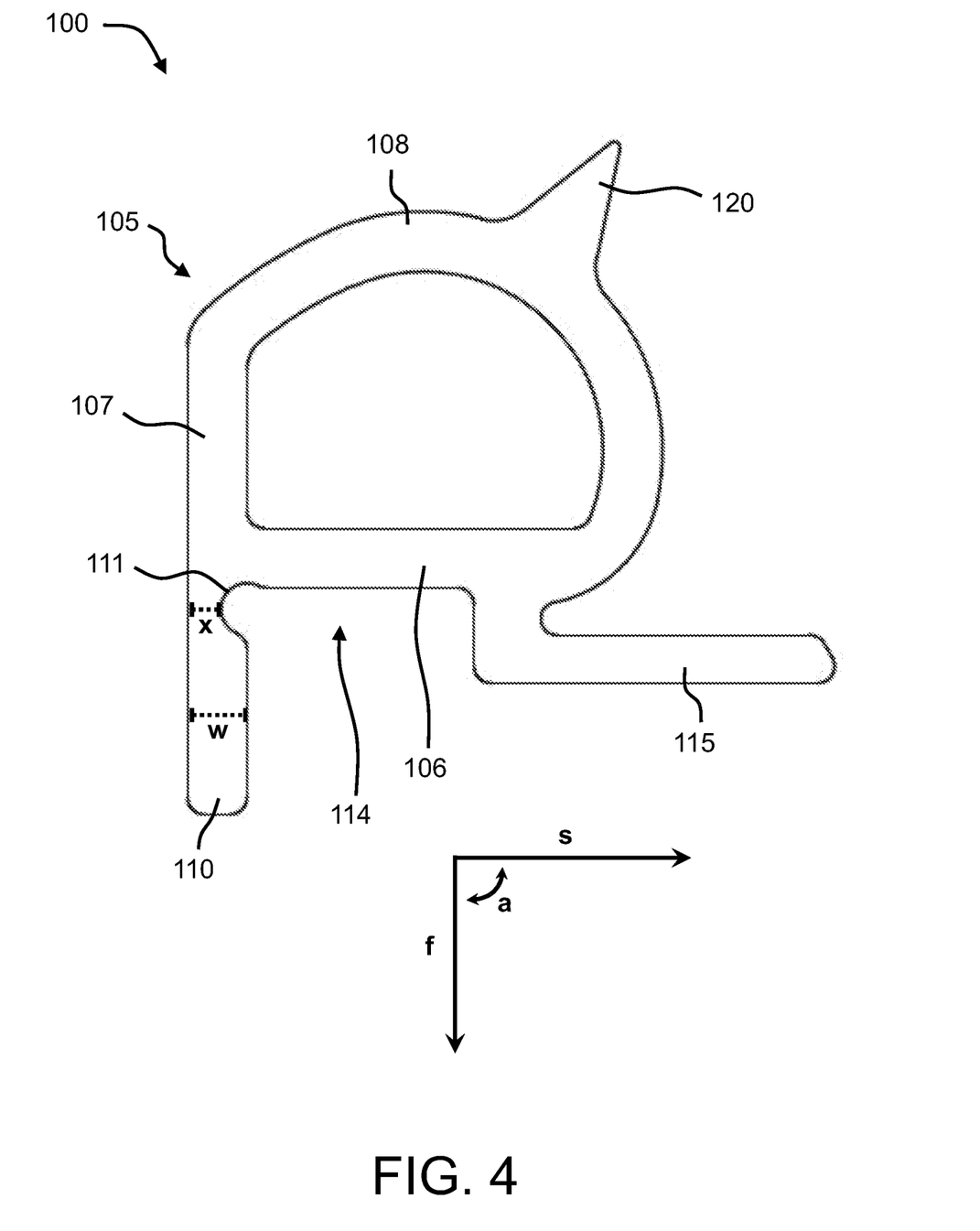
FIG. 4 is a side view of the embodiment of the seal depicted in FIG. 3.

FIG. 4 is a side view of the seal 100 of FIG. 3. In this embodiment, the hinge point 111 comprises a thinner piece of material. Said differently, the thickness of material at hinge point 111 is thinner than the thickness of the leg 110. Leg 110 is configured to rotate relative to bulb 105 about hinge point 111 such that the leg 110 narrows a portion of recess 114.

Figure 5:
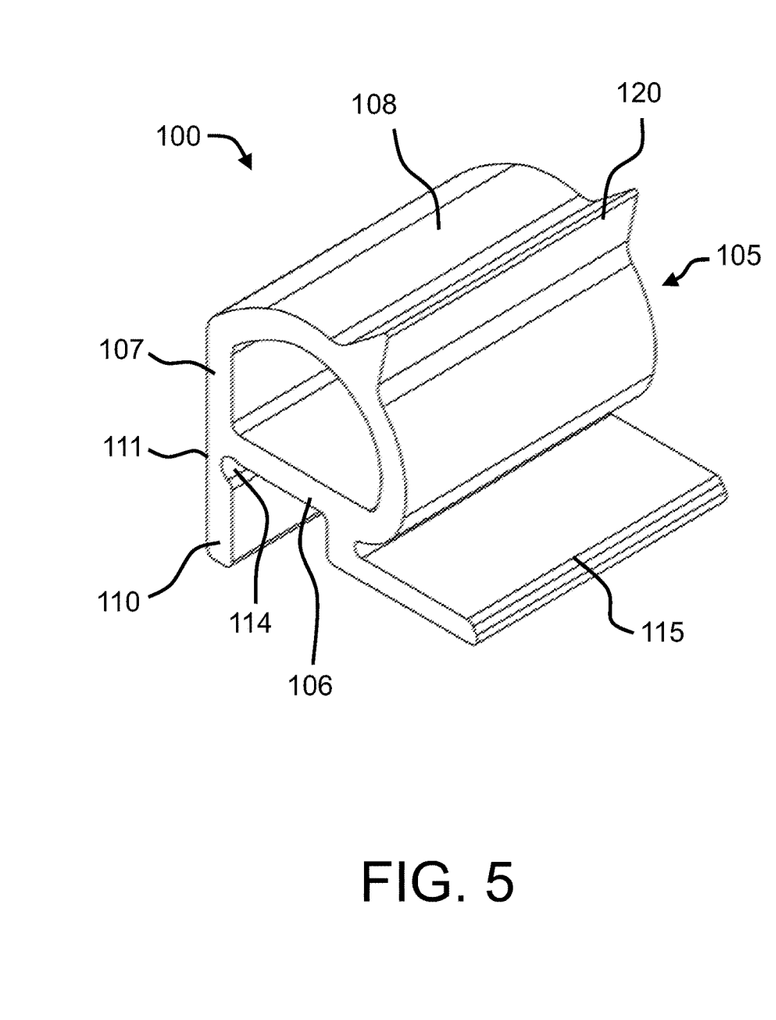
FIG. 5 depicts the seal of FIG. 3 in a neutral state.
Figure 6:
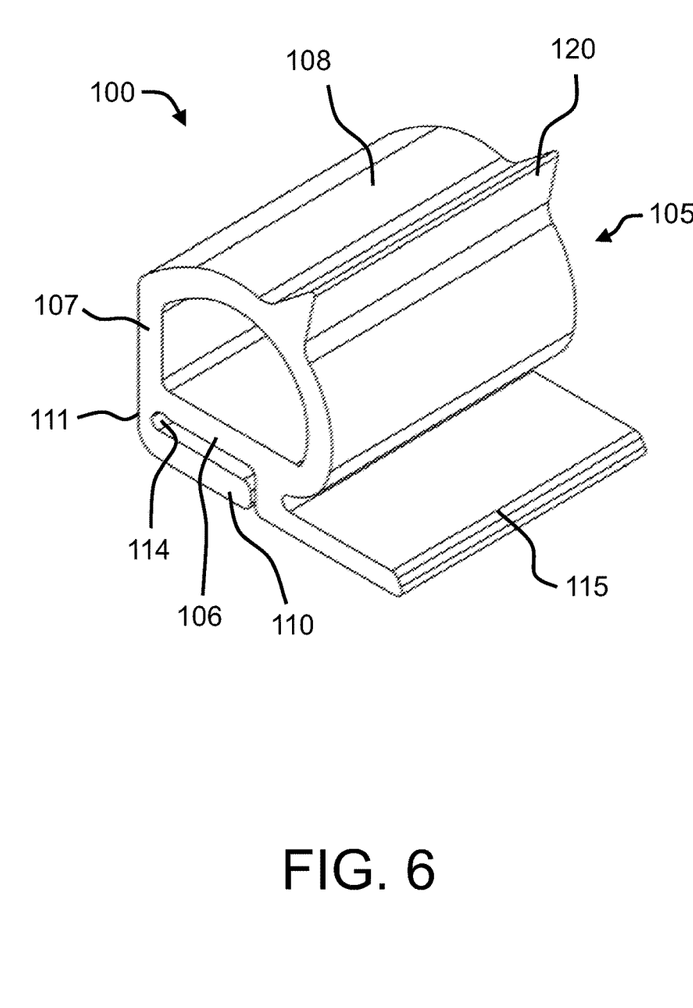
FIG. 6 depicts the seal of FIG. 3 in a bent state.
Figure 7:
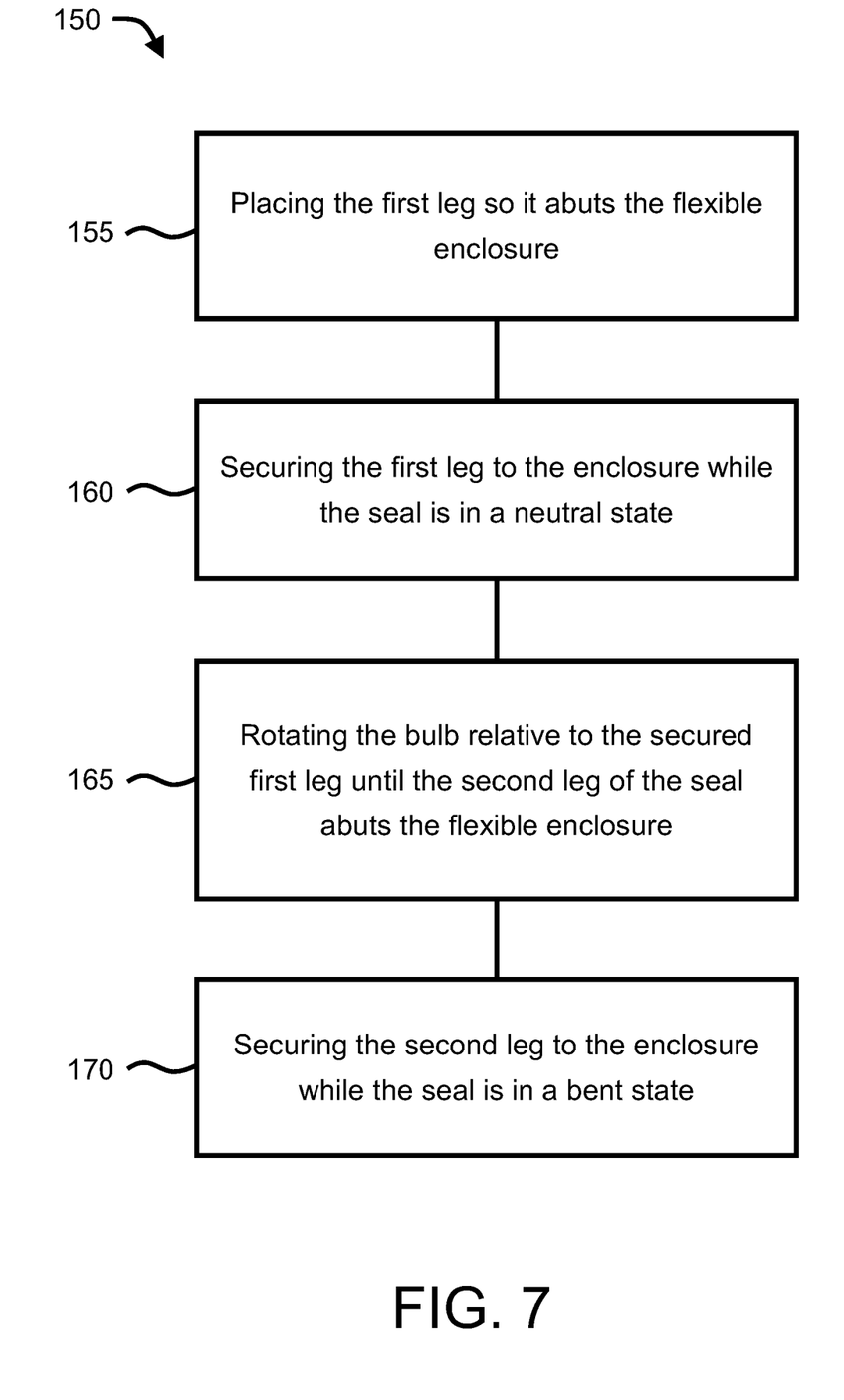
FIG. 7 is a flow chart of an embodiment of a method of attaching the seal of FIG. 3 to a flexible enclosure.

Referring now to FIGS. 5, 6, and 7, a method of attaching/securing the seal 100 to a flexible enclosure is disclosed. At FIG. 5, leg 110 and the second sidewall 107 of the bulb 105 are placed abutting the flexible enclosure. In this configuration, the seal 100 is in a "neutral" state. The neutral state of seal 100 of this embodiment comprises the leg 110 being 90 degrees offset from the leg 115, as shown. In other embodiments, the degree of offset between the leg 110 and the leg 115 is at least 45 degrees. Once placed, the leg 110 is securely attached to the flexible enclosure. Any suitable form of attachment may be used. As a few non-limiting examples, the leg 110 may be sewn to the flexible enclosure, adhesives may be used, welding, such as ultrasonic welding may be used or fasteners may be used.

During attachment, first side 112 of leg 110 is placed abutting the flexible enclosure. This orientation readily exposes second side 113 of leg 110 to an assembler that is securing the seal 100 to the enclosure. Accordingly, in an example embodiment wherein the seal 100 is sewn to the enclosure, the sewing machine/needle pierces the second side 113 through first side 112 and then through the flexible enclosure. The machine/needle can then pierce the opposite direction to continue the stitching/sewing process. Exposure of the second face 113 of leg 110 simplifies the attachment process and frees up an assembler's hands to better secure the seal 100 to the flexible enclosure.

After leg 110 is attached, the bulb 105 is rotated about hinge point 111 so that leg 115 abuts the flexible enclosure and is colinear with leg 110, shown in FIG. 6. The configuration illustrated in FIG. 6 is the "bent" state of seal 100. After rotation of bulb 105, the second sidewall 107 is roughly perpendicular to legs 110, 115. Leg 115 is securely attached to the flexible enclosure. In some embodiments, the leg 115 is attached to the flexible enclosure in the same manner as leg 110. In other embodiments, a different attachment means is utilized to attach leg 115.

In this embodiment, when the seal 100 is in the bent state, leg 110 is parallel to and vertically stacked with the first sidewall 106 of bulb 105. Contemporaneously, leg 115 is parallel to but not vertically stacked with the first sidewall 106 of the bulb 105. As shown, after the seal 100 is attached to the flexible enclosure, the leg 110 occupies a portion of the recess 114 defined by the second face 113 of leg 110 and first sidewall 106.

FIG. 7 is a flow chart of an embodiment of a method 150 of attaching seal 100 to a flexible enclosure. At 155, leg 110 is placed on the flexible enclosure in its neutral state such that the first side 112 of leg 110 abuts the flexible enclosure. The leg 110 is then secured to the flexible enclosure at 160 by any appropriate means. In one embodiment, leg 110 is sewn to the flexible enclosure. At 165, the bulb 105 is rotated relative to the secured leg 110 via hinge point 111 until seal 100 is in a bent state and leg 115 also abuts the flexible enclosure. At 170, the leg 115 is also secured/attached to the flexible enclosure. Leg 115 may be attached to the flexible cover utilizing the same means as attachment of leg 110 to the flexible enclosure. In other embodiments, different attachment means are used to attach leg 110 and leg 115 to the flexible cover (e.g., leg 110 is sewn to the flexible cover and adhesives are used to attach leg 115 to the flexible cover). In other embodiments, a welding machine (e.g., ultrasonic) may be used to attach either one of or both of legs 110, 115.

Figure 8:
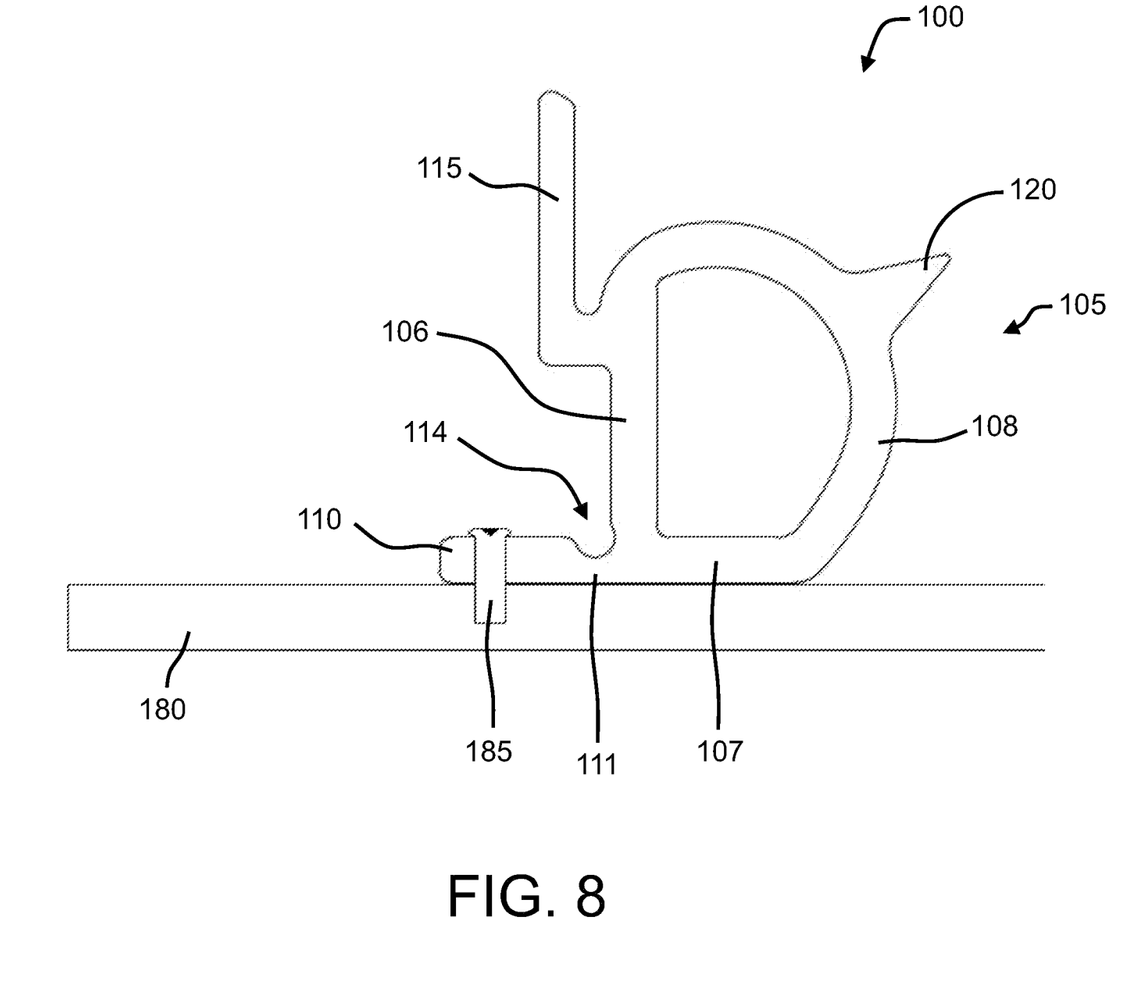
FIG. 8 is a cross-sectional view of a first leg of a seal being attached to a flexible enclosure.
Figure 9:
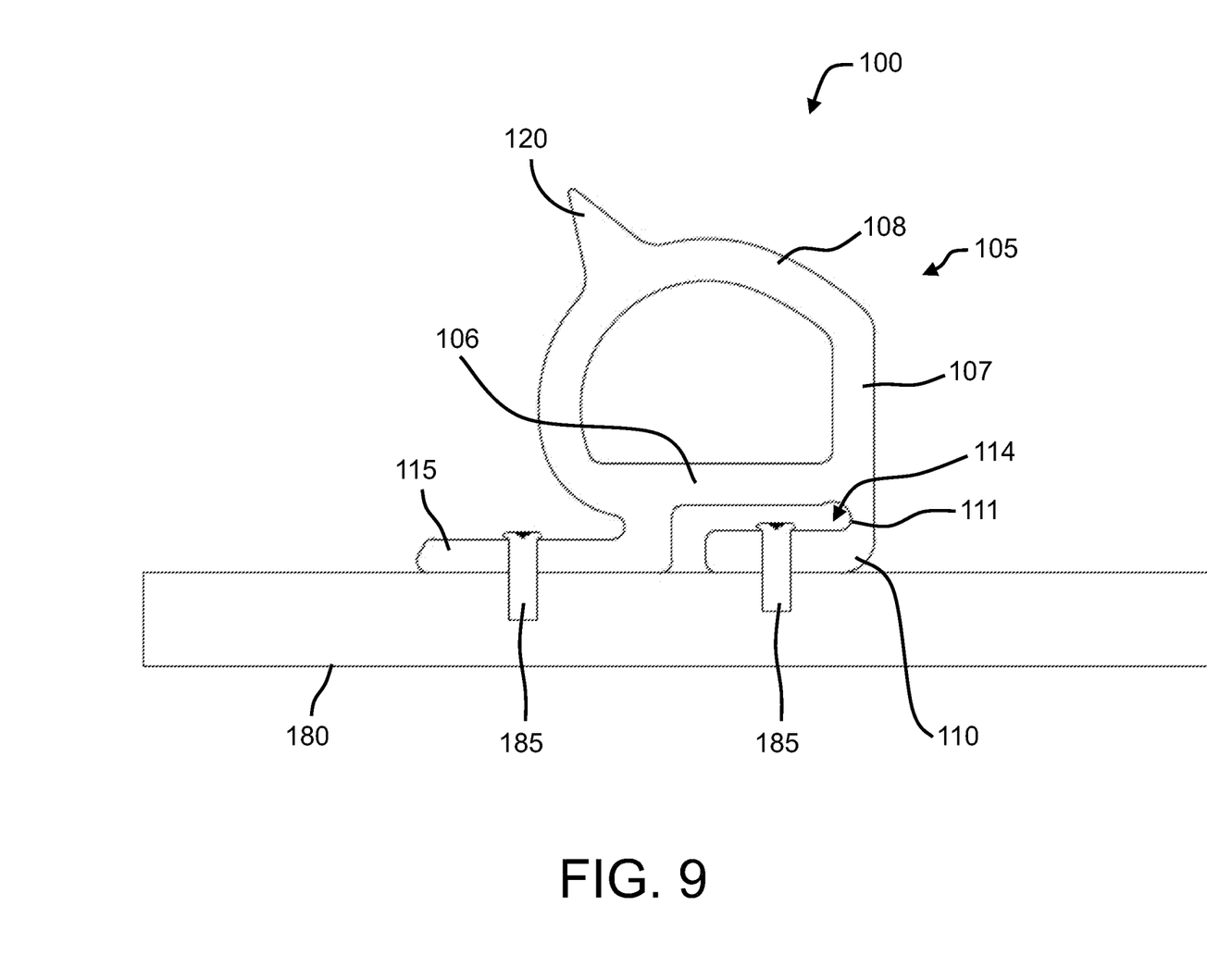
FIG. 9 is a cross-sectional view of a second leg of the seal of FIG. 8 being attached to the flexible enclosure.

FIGS. 8 and 9 illustrate cross-sectional views of the attachment method discussed with reference to FIGS. 5, 6, and 7. In FIG. 8, the leg 110 of the seal 100 is securely fastened to a flexible enclosure 180 via fastener 185 while seal 100 is in its neutral state. As shown, the fastener 185 is a bolt, screw, rivet, or the like. As mentioned previously, in some embodiments, the legs 110, 115 are secured to the flexible enclosure 180 by sewing. The attachment means is inserted through the leg 110 into the flexible enclosure 180 while ensuring that the first side 112 of the leg 110 abuts the flexible enclosure 180.

In FIG. 9, the bulb 105 is rotated about hinge point 111 so that leg 115 abuts the flexible enclosure 180 and is colinear with leg 110, thereby placing the seal 100 in its bent state. A second fastener 185 secures the leg 115 to the flexible enclosure 180. While depicted as the same attachment mechanism, attachment of leg 110 and leg 115 can be realized using different methods. For example, a rivet may secure leg 110 while leg 115 is sewn to the flexible enclosure 180.

While the invention has been described in detail in the foregoing description, the same is to be considered as illustrative and not restrictive in character, it being understood that all changes and modifications that come within the spirit of the invention are desired to be protected. In addition, all references cited herein are indicative of the level of skill in the art and are hereby incorporated by reference in their entirety.

What is claimed:

1. A seal configured to be coupled to a flexible enclosure, the seal comprising:
   a bulb with a first end and a second end defining a length therebetween, the bulb comprising a first and second sidewall;
   a first leg extending in a first direction from the first sidewall of the bulb along the length of the bulb when in a neutral state of the seal, wherein the first leg is hingably attached to the bulb; and
   a second leg extending in a second direction from the first sidewall of the bulb along the length of the bulb when in the neutral state of the seal, wherein the second direction is offset at least 45 degrees from the first direction of the first leg;
   wherein the first leg is adapted to be hinged relative to the bulb until the first and second directions of the first and second legs are colinear in a bent state of the seal where the first leg is bent; and
   wherein the first and second legs are adapted to be attached to the flexible enclosure.

2. The seal of claim 1, wherein the first and second legs are adapted to be sewn to the flexible enclosure.

3. The seal of claim 2, wherein the seal is adapted to have the first leg sewn to the flexible enclosure while the first leg is in the neutral state and wherein, once the first leg is sewn to the flexible enclosure, the first leg is adapted to be bent to position the first leg between the seal and the flexible enclosure while the second leg is sewn to the flexible enclosure.

4. The seal of claim 1, wherein the bulb further comprises a protrusion extending from the bulb along the entire length of the bulb.

5. The seal of claim 1, further comprising a thin portion coupling the first leg to the bulb, wherein a thickness of the thin portion is less than a thickness of the first leg.

6. The seal of claim 5, wherein a first side of the first leg and the second sidewall are colinear when the seal is in the neutral state.

7. The seal of claim 6, wherein a second side of the first leg defines a recess that corresponds to the thin portion.

8. The seal of claim 7, wherein the second side of the first leg faces the second leg.

9. The seal of claim 1, further comprising a flexure bearing coupling the first leg to the bulb.

10. The seal of claim 1, wherein the bulb of the seal has a "D" shaped cross section.

11. The seal of claim 1, wherein the bulb defines a hollow interior.

12. The seal of claim 1, wherein the seal is a unitary molded, monolithic structure.

13. The seal of claim 1, wherein the second leg initially extends from the first sidewall of the bulb in the first direction then extends in the second direction such that the second leg defines an "L" shape.

14. The seal of claim 1, wherein the seal is formed by extrusion.

15. The seal of claim 1, wherein the second direction is approximately 90 degrees offset from the first direction of the first leg.

16. The seal of claim 1, wherein the second leg does not include a flexure bearing.

17. The seal of claim 1, wherein the seal is adapted to secure the first leg to the flexible enclosure while the first leg is in the neutral state and wherein, after the first leg is secured to the flexible enclosure, the first leg is adapted to bend to position the second leg against the flexible enclosure to secure the second leg to the flexible enclosure.

18. The seal of claim 17, wherein the first and second legs of the seal are adapted to be sewn to the flexible enclosure.

19. The seal of claim 17, wherein, after the second leg of the seal is secured to the flexible enclosure, the first leg of the seal is parallel to and vertically stacked with the first sidewall of the bulb.

20. The seal of claim 19, wherein, after the second leg of the seal is secured to the flexible enclosure, the second leg of the seal is parallel to but not vertically stacked with the first sidewall of the bulb.

21. The seal of claim 1, wherein the flexible enclosure is a soft cab enclosure for a vehicle.

* * * * *